United States Patent

[11] 3,571,819

[72] Inventor Joseph F. Puncochar
 205 Commonwealth Ave., Alexandria, Va.
 22301
[21] Appl. No. 875,709
[22] Filed Nov. 12, 1969
[45] Patented Mar. 23, 1971

[54] BATHING DEVICE
 7 Claims, 4 Drawing Figs.
[52] U.S. Cl...................................................... 4/171,
 114/222
[51] Int. Cl...................................................... A47k 3/00
[50] Field of Search.......................................... 4/171, 172,
 172.11, 172.12, 172.13, 172.14, 172.15, 172.16,
 172.17, 172.18, 172.19, 172.21

[56] References Cited
 UNITED STATES PATENTS
 208,360 9/1878 Banber......................... 4/171
 1,925,175 9/1933 Day............................... 4/171
 2,013,635 9/1935 Serafinowicz................. 4/171
 3,026,538 3/1962 Boyd et al..................... x4/171; 172
 3,309,716 3/1967 Merritt......................... x4/172; 172.13
 3,363,268 1/1968 Friedlander.................. x4/172; 172.19
 3,417,747 12/1968 Beger........................... 128/66; x4/171
 3,456,265 7/1969 Carnahan..................... 4/172

Primary Examiner—Laverne D. Geiger
Assistant Examiner—Donald B. Massenberg
Attorney—Robert I. Lainof ABSTRACT: A water-permeable bathing device is provided for separating a section of water from a main body thereof in which floats are used to mark off the section of water to be protected and a vertical openwork barrier is secured to the floats and extends downwardly therefrom to the desired depth, and means are provided to release bubbles of gas at the bottom of the barrier to provide a curtain of rising bubbles in the immediate vicinity of the barrier to cooperate with the barrier and exclude undesirable sea organisms.

INVENTOR.
JOSEPH F. PUNCOCHAR
BY Robert I Lainof
ATTORNEY

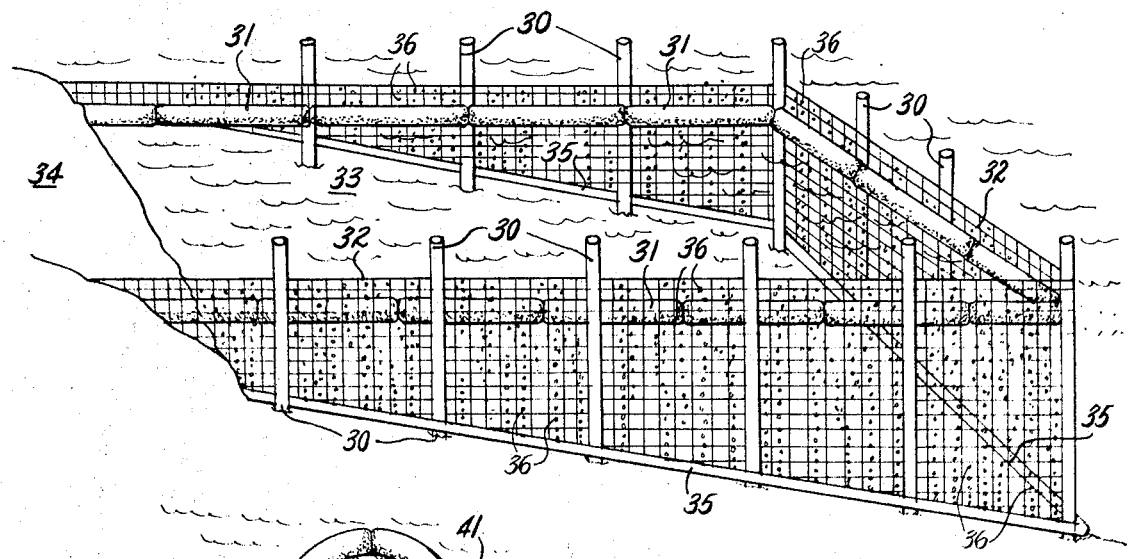
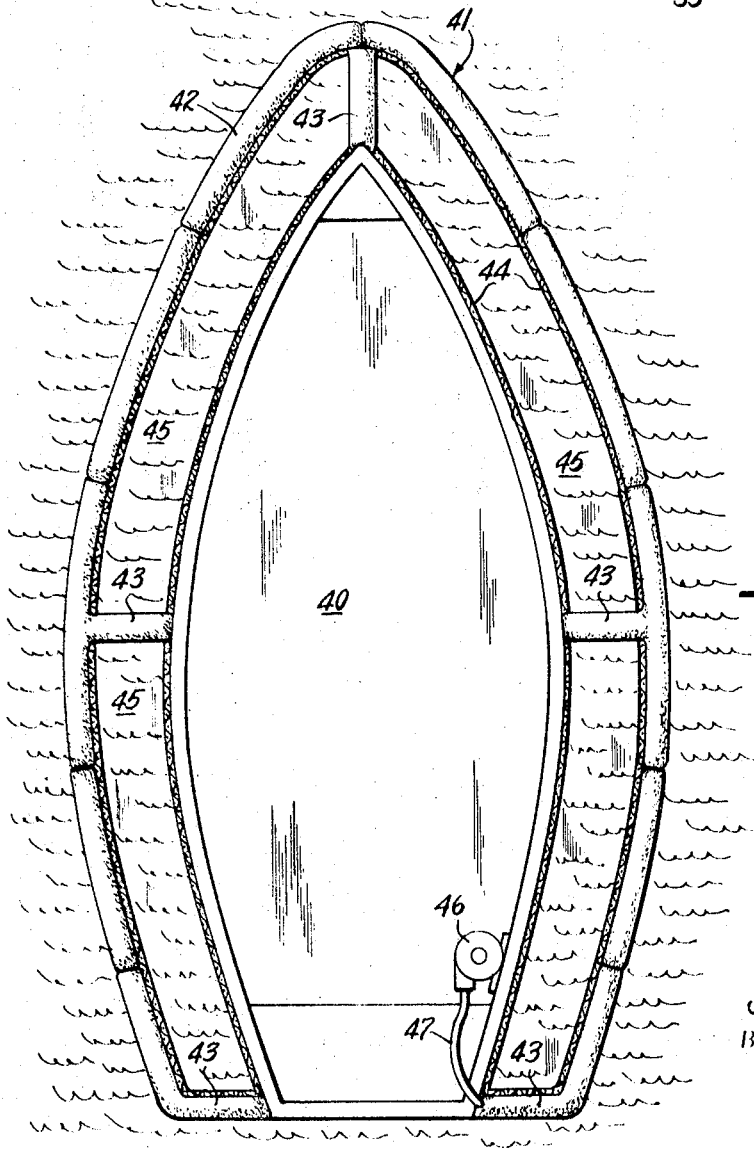

BATHING DEVICE

The present invention relates to a bathing device enabling a section of water to be sufficiently separated from the main body of water to permit bathing and swimming at any desired point in open water with protection being provided against jellyfish (sea nettles), noxious fishes and voracious aquatic animals.

While it is possible to employ an impervious tank or the like capable of physically separating the main body of water from the section to be used, there is an obvious difficulty and expense in doing so. A water-pervious barrier, makes the task of walling off the desired section of water easier, but at the same time, as the main body of water moves through the openings in the barrier, it may carry with it all sorts of undesirable organisms, and the larger the openings, the more undesirable organisms are able to penetrate. Even if one is able to chemically or physically purify the water within the barrier, this water is replaced by the main body of water and there is no mechanism available for preventing the ingress of the undesirable organisms under consideration.

In the present invention, floats are used to mark off the section of water to be protected and a vertical openwork barrier is secured to the floats and extends downwardly therefrom to the desired depth where it may terminate in a bottom of any desired type including the bottom of the lake or other body of water being utilized. There is then positioned at the bottom of said barrier means for liberating bubbles of gas (normally air) to provide a curtain of rising bubbles in the immediate vicinity of the openwork barrier. This curtain of rising bubbles in cooperation with the openwork barrier is effective to exclude undesirable organisms from the protected section of water although the main body of water is able to easily pass through the barrier and through the protected section of water.

As will be evident, the bubbles cling to elements, such as water-pervious nylon cloth, metal cloth, and wires, which constitute the barrier and make the barrier appear to be more massive. Also, the bubbles become associated with smaller organisms and carry them to the surface, thereby preventing them from clinging to or passing through the openings in the barrier.

It is normally sufficient to simply blow air and thereby create a curtain of air bubbles, but it is possible to supplement the air in the bubbles by employing noxious substances in solid liquid or gaseous form. These noxious substances can be associated in any desired way with the bubbles as by discharging the desired agent in the vicinity of the rising bubbles or by incorporating the agent into the air which is supplied to form the bubbles.

With the main body of water able to pass freely through the openwork barrier, noxious substances are ordinarily of little value since they are quickly washed away. Here, the association of the noxious substance with the bubbles keeps the selected agent in the vicinity of the barrier and provides a localized concentration where it is most useful.

It will be appreciated that the bathing device of the invention is subject to considerable variation. Thus, the floats may be of any type and define a peripheral line of any desired shape. Normally, an enclosed area will be defined by the floats, but this is not essential since a portion of an enclosed area can be defined by a portion of shore line or by a boat or barrier of some sort with the floats defining the balance of the closed area.

Similarly, the precise nature of the openwork barrier may vary depending on ancillary factors such as the permanency desired, the size of the openings, and the expense which can be accepted. Water-pervious nylon cloth and the like as well as ordinary screening constituted by wires having a diameter up to about ¼ inch and defining openings up to about 2 inches represents normal practice looking toward the use of material of minimal expense combined with maximum handling ease. Thus, water-pervious nylon cloth and the like, as well as screening normally available to screen in porches can be used as can materials of the nature of wire fencing.

The openwork barrier may extend to the floor of the body of water, or it may terminate at a higher level, in which case, a bottom which is preferably impervious is extended across the open area defined by the lower end of the barrier in order to close off the protected section of water at the lower end thereof.

It will also be appreciated that some users will wish the bathing device to be portable and some will prefer a more permanent and substantial structure, and these considerations will dictate the rigidity of the openwork barrier and the bottom, if any, as well as the size of the structure and the sophistication of the floats.

The curtain of rising bubbles is conveniently supplied by means of a perforated pipe or tube which extends along the bottom of the barrier and is secured thereto in any desired fashion. There is also provided a pump or tank of compressed gas to supply air to the pipe or tube and an appropriate connection therebetween.

Ancillary devices such as weights, anchors, braces and the like to maintain the shape of the enclosure or for other purposes may also be present. Also, the perforated pipe or tube may function to assist in maintaining the shape of the enclosure and, for this purpose, it may be present at the top of the barrier as well as at the bottom.

The invention is illustrated in the accompanying drawings in which:

FIG. 3 is a perspective view showing a more permanent bathing device situated at the shore line; and FIG. 4 is a top view of a bathing device associated with a boat.

Figure 1:
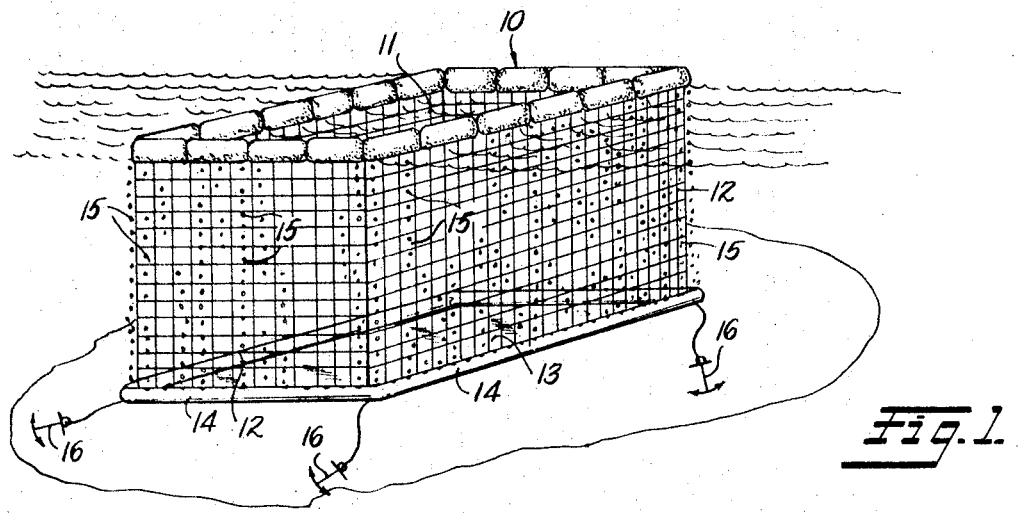
FIG. 1 is a perspective view of an illustrative structure in which the bathing device rests upon the floor of the body of water involved.

Referring more particularly to FIG. 1, the numeral 10 identifies floats which are secured to form an enclosured area 11 and cloth or screening 12 is hung from the floats to extend downwardly to the floor 13 of the body of water. A perforated tube 14 is secured to the lower end of the screening 12 and bubbles 15 are shown rising therefrom to form a curtain as has been described. Anchors 16 are used to maintain the position of the structure in the body of water. The source of air and the conduit carrying the same to the tube 14 are not shown, but wholly conventional.

Figure 2:
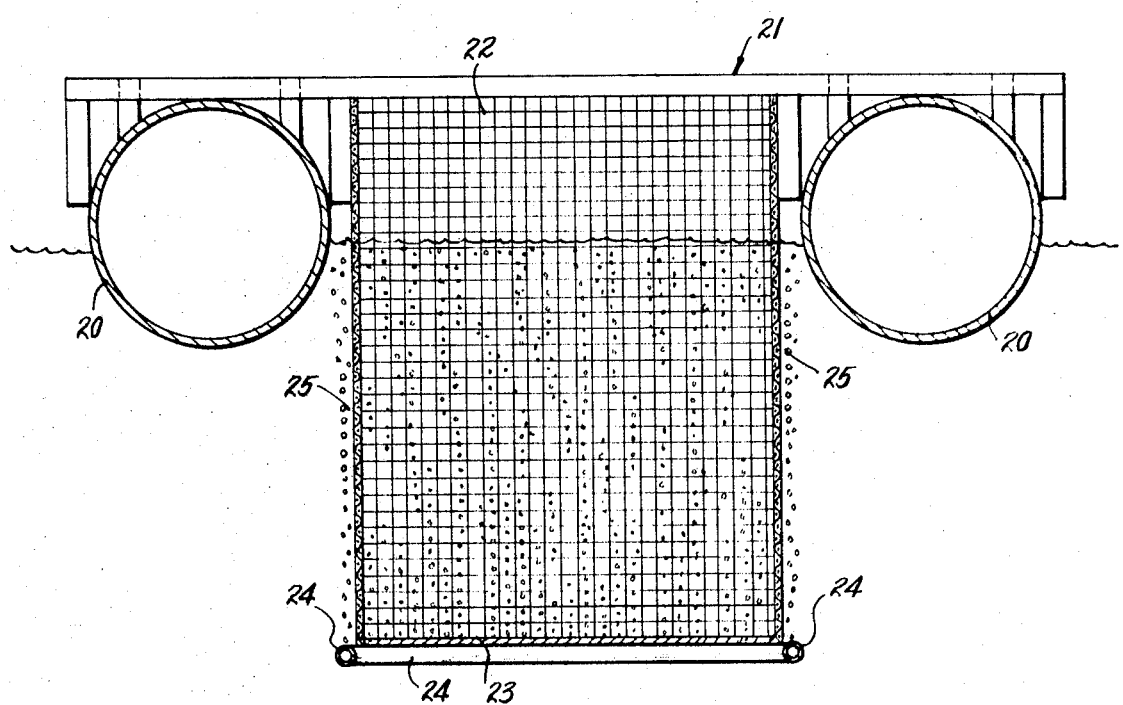
FIG. 2 is a cross section of a modified structure in which parallel pontoon floats support a bathing device which does not reach the floor of the body of water.

In FIG. 2, pontoons 20 are used to support a rectangular superstructure 21 from which is hung screening 22. The screening 21 supports a malleable sheet metal panel 23 which forms a bottom for the enclosure and perforated pipe 24 extends around the periphery at the bottom to emit bubbles 25 to provide the desired air curtain.

In FIG. 3, stakes 30 are used to position the floats 31 and to assist in carrying screening 32 which extends to the flow 33 of the body of water. A portion of the desired enclosure is provided by the beach 34. The perforated pipe 35 runs along the floor 33 to provide the bubbles 36 constituting the air curtain.

In FIG. 4, in the boat is identified at 40 and it will be seen that the sides of the boat carry an inflated rubber float 41 constituted by float elements 42 which, with the sides of the boat define a pool enclosure. Connecting elements 43 secure the floats 42 to the sides of the boat. Screening identified at 44 hangs downwardly from the floats 42 and from the sides of the boat to form, in FIG. 4, a U-shaped area of protected water. Perforated tubing and a bottom 45 are employed in this structure as shown in FIG. 2 and the tubing connected to the bottom of the screening provides the bubbles and is connected to pump 46 by line 47.

The invention is defined in the claims which follow.

I claim:

1. A bathing device for sufficiently separating a section of water from a main body thereof to permit bathing and swimming while excluding jellyfish, sea nettles, noxious fishes and voracious aquatic organisms comprising, floats marking off the section of water to be protected, a vertical openwork barrier secured to said floats and extending downwardly therefrom to the desired depth, and means for liberating bubbles of gas positioned at the bottom of said barrier to provide a curtain of rising bubbles in the immediate vicinity of said barrier to cooperate with said barrier in excluding said sea organisms from the protected section of water.

2. A bathing device as recited in claim 1 in which said bubbles are associated with a noxious substance to further assist in the exclusion of said sea organisms.

3. A bathing device as recited in claim 1 in which said openwork barrier is screening.

4. A bathing device as recited in claim 1 in which said openwork barrier extends to the floor of the body of water.

5. A bathing device as recited in claim 4 in which said floats cooperate with a portion of shoreline to mark off the section of water to be protected.

6. A bathing device as recited in claim 1 in which said openwork barrier terminates above the floor of the body of water and supports an imperforate bottom.

7. A bathing device as recited in claim 1 in which said bathing device is associated with a boat the sides of which cooperate with said float to mark off the section of water to be protected and a portion of said openwork barrier is secured to the sides of said boat.